(12) United States Patent
Ochiai

(10) Patent No.: US 6,178,004 B1
(45) Date of Patent: Jan. 23, 2001

(54) METHOD AND APPARATUS FOR FORMING IMAGES

(75) Inventor: Masato Ochiai, Yokohama (JP)

(73) Assignee: Canon Kabushiki Kaisha, Tokyo (JP)

( * ) Notice: Under 35 U.S.C. 154(b), the term of this patent shall be extended for 0 days.

(21) Appl. No.: 08/888,047

(22) Filed: Jul. 3, 1997

(30) Foreign Application Priority Data

Jul. 3, 1996 (JP) .................................................. 8-173797
Feb. 3, 1997 (JP) .................................................. 9-020403

(51) Int. Cl.⁷ .................................................. B41B 19/00
(52) U.S. Cl. .......................... 358/1.14; 709/219; 709/228
(58) Field of Search .................................... 395/114, 106, 395/117, 109, 500, 651, 800.3, 856–858, 860, 200.49, 200.58; 358/1.14, 1.06, 1.17, 1.09; 713/1; 712/30; 710/36–38, 40; 709/219, 228

(56) References Cited

U.S. PATENT DOCUMENTS

| | | | |
|---|---|---|---|
| 5,220,674 | * 6/1993 | Morgan et al. | ....................... 395/800 |
| 5,367,635 | * 11/1994 | Bauer et al. | .......................... 395/200 |
| 5,475,801 | * 12/1995 | Brindle et al. | ........................ 395/114 |
| 5,490,252 | * 2/1996 | Macera et al. | ................... 395/200.01 |
| 5,655,152 | * 8/1997 | Ohnishi et al. | ........................ 395/856 |

* cited by examiner

Primary Examiner—Mark Zimmerman
Assistant Examiner—Lance W. Sealey
(74) Attorney, Agent, or Firm—Fitzpatrick, Cella, Harper & Scinto

(57) ABSTRACT

To set parameters of peripheral apparatus, including an image forming apparatus such as a printer, and to inform the status of the peripheral apparatus to a host computer by using SNMP and extended MIB, a method of forming images comprises a first input step of receiving from a predetermined input source a change permission request command for requesting change permission of a predetermined set value of an image forming apparatus, a responding step of responding change permission data to the predetermined input source corresponding to the change permission request command received in the first input step, a second input step of receiving from the predetermined input source a change request command for requesting change of the predetermined set value of the image forming apparatus, and a changing/informing step of changing the predetermined set value in accordance with the change request command received in the second input step and informing the predetermined input source of that the predetermined set value has been changed.

60 Claims, 12 Drawing Sheets

(BLOCK DIAGRAM OF NETWORK BOARD)

METHOD AND APPARATUS FOR FORMING IMAGES

BACKGROUND OF THE INVENTION

1. Field of the Invention

The present invention relates to a method of and an apparatus for forming images, and more particularly to an image forming method and apparatus adapted for use under environment in which the apparatus is connected to host computers via a network.

2. Description of the Related Art

Heretofore, serial interfaces, parallel interfaces or the like have been incorporated, as communication means with respect to host computers, in printers according to standard specifications. Recently, with development of networks, interfaces for communicating with host computers via networks have also been incorporated in printers.

Such interfaces enable users to share a printer via a network to which the printer is connected.

Also, users can monitor the status (on-line, offline, under data processing, etc.) of a printer connected to a network from host computers, which are installed at remote locations, via the network, and manage the printer status.

However, the conventional systems for communicating a printer and host computers have had problems below.

Because of a printer being shared by a plurality of users, if one user resets the state of the printer from a remote location when the printer is printing or is about to start printing, the setting of data to be processed by the printer or the initial values of the printer may be written over.

Further, since printing parameters (selection of cassette, the number of copies, etc.) are conventionally set in various types of PDL (e.g., LIPS and PCL), the load on a printer controller is increased and the printer speed is reduced.

SUMMARY OF THE INVENTION

In view of the problems as stated above, an object of the present invention is to provide an image forming method and apparatus capable of forming images free from errors under environment in which the apparatus is connected to a plurality of host computers in common.

To achieve the above object, the method of and the apparatus for forming images according to the present invention is constituted as follows. The method of forming images comprises a first input step of receiving from a predetermined input source a change permission request command for requesting change permission of a predetermined set value of an image forming apparatus, a responding step of responding change permission data to the predetermined input source corresponding to the change permission request command received in the first input step, a second input step of receiving from the predetermined input source a change request command for requesting change of the predetermined set value of the image forming apparatus, and a changing/informing step of changing the predetermined set value in accordance with the change request command received in the second input step and informing the predetermined input source of that the predetermined set value has been changed.

According to another aspect of the present invention, the apparatus for forming images comprises first input means for receiving from a predetermined input source a change permission request command for requesting change permission of a predetermined set value of an image forming apparatus, responding means for responding change permission data to the predetermined input source corresponding to the change permission request command received by the first input means, second input means for receiving from the predetermined input source a change request command for requesting change of the predetermined set value of the image forming apparatus, and changing/informing means for changing the predetermined set value in accordance with the change request command received by the second input means and informing the predetermined input source of that the predetermined set value has been changed.

According to still another aspect, the present invention provides a computer program product including a medium which has program code means readable by a computer and is usable with the computer, the computer program product comprising first program code means readable by the computer and receiving from a predetermined input source a change permission request command for requesting change permission of a predetermined set value of an image forming apparatus, second program code means readable by the computer and responding change permission data to the predetermined input source corresponding to the change permission request command received by the first program code means, third program code means readable by the computer and receiving from the predetermined input source a change request command for requesting change of the predetermined set value of the image forming apparatus, and fourth program code means readable by the computer, changing the predetermined set value in accordance with the change request command received by the third program code means, and informing the predetermined input source of that the predetermined set value has been changed.

According to still another aspect, the present invention provides an apparatus for forming images, comprising transfer means for transferring instruction information for an image forming apparatus and code information representing pages, and control means for controlling the image forming apparatus based on the information transferred by the transfer means, the instruction information employing SNMP and extended MIB.

According to still another aspect, the present invention provides a method of forming images, comprising a step of receiving instruction information for an image forming apparatus and code information representing pages, and a step of controlling the image forming apparatus based on the information received by the step, the instruction information employing SNMP and extended MIB.

In the above apparatus for and method of forming images, preferably, the instruction information is instruction information input from an apparatus control panel.

Specifically, according to the above apparatus for and method of forming images, Canon-MIB (Management Information Base) for setting the image forming apparatus to be on-line/off-line is employed to set the image forming apparatus to be on-line/off-line by a Set command of SNMP (Simple Network Management Protocol). Also, the image forming apparatus (including a network board) is set to desired one of various operating modes by preparing the Canon-MIB so as to contain MIB for designating the number of multiple copies and the operating mode (LIPS, N201, etc.)

DETAILED DESCRIPTION OF THE PREFERRED EMBODIMENTS

A method of and an apparatus for forming images according to the present invention will be described below in detail in connection with preferred embodiments.

The construction of a laser beam printer embodying the present invention will be first described with reference to FIG. 1.

Figure 1:
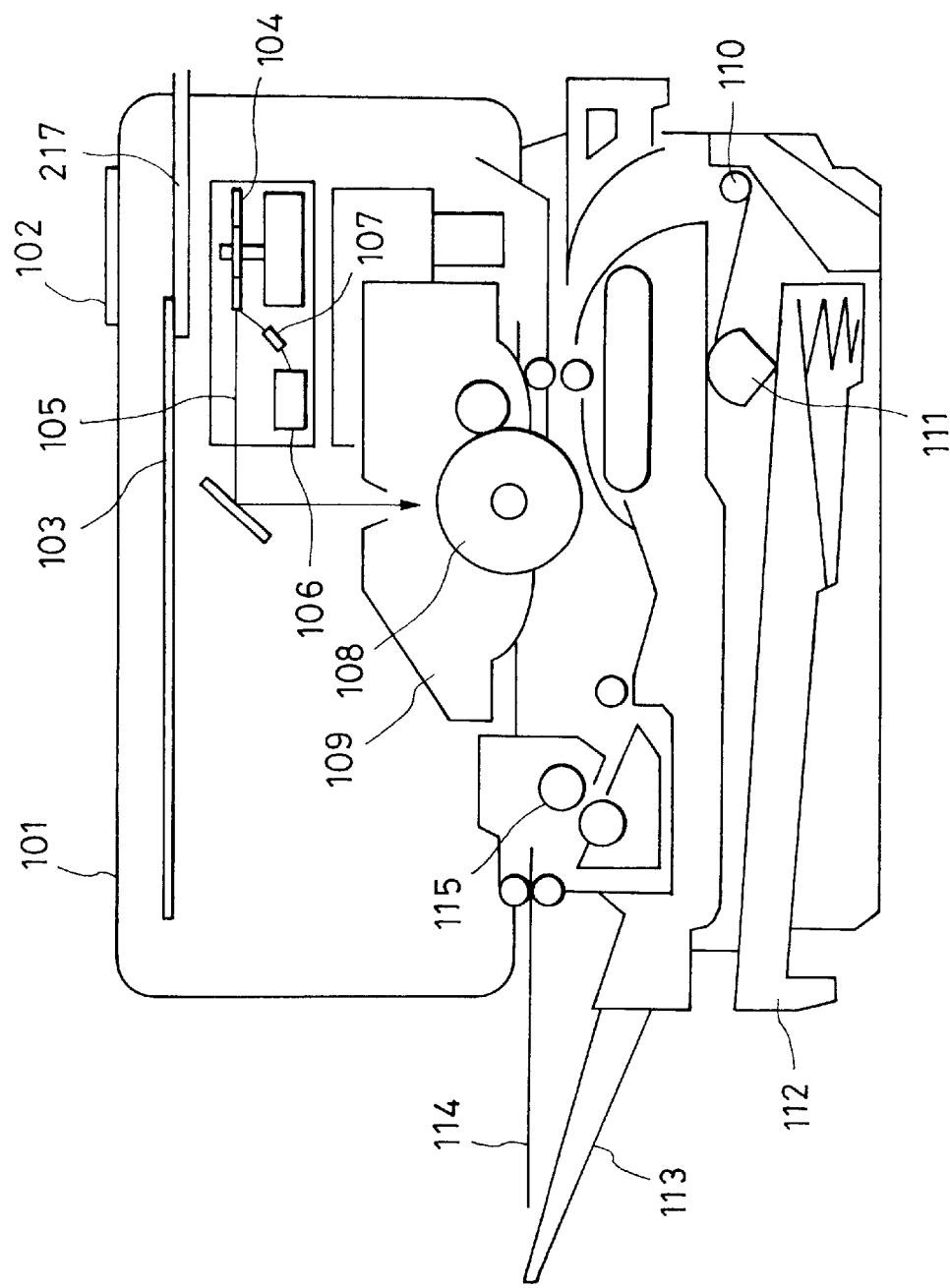
FIG. 1 is a sectional view showing an internal structure of a laser beam printer according to one embodiment of the present invention.

FIG. 1 is a sectional view showing an internal structure of a laser beam printer (hereinafter abbreviated to LBP) according to one embodiment of the present invention. This LBP is constructed such that character patterns, form data, etc. can be registered in the LBP from a data source (not shown).

Referring to FIG. 1, denoted by 101 is an LBP proper for receiving and storing character information (character codes), form information, macro instructions, etc. supplied from an external device (not shown). The LBP 101 also creates corresponding character patterns or form patterns in accordance with those information, and forms an image on recording paper as a recording medium.

Denoted by 102 is a control panel on which there are arranged switches for instructing operations, and LED indicators and a LCD display for indicating the status of the printer.

Denoted by 103 is a printer control unit for controlling the entirety of the LBP 101 and analyzing the character information, etc. supplied from the external device. As a main task, the printer control unit 103 converts video signals of character patterns corresponding to the character information and outputs resulted signals to a laser driver 106.

Denoted by 217 is an external communication unit connected to the printer control unit 103.

The laser driver 106 is a circuit for driving a semiconductor laser 107 and switching on/off a laser beam 105 emitted from the semiconductor laser 107 in accordance with the video signals input thereto.

The laser beam 105 is oscillated transversely by a rotating polygonal mirror 104 to scan an outer circumferential surface of an electrostatic drum 108 for exposure. An electrostatic latent image of character patterns is thereby formed on the outer circumferential surface of the electrostatic drum 108.

The latent image is developed by a developing unit 109 disposed around the electrostatic drum 108 and then transferred onto recording paper.

The recording paper is in the form of cut sheets which are accommodated in a paper cassette 112 attached to the LBP 101. The cut sheets of recording paper are taken into the LBP 101 and supplied to the electrostatic drum 108 one by one by a paper feed roller 111 and a transport roller 110. The sheet of recording paper having an image transferred thereon is ejected to the outside of the LBP 1 by ejection rollers 115.

Figure 2:
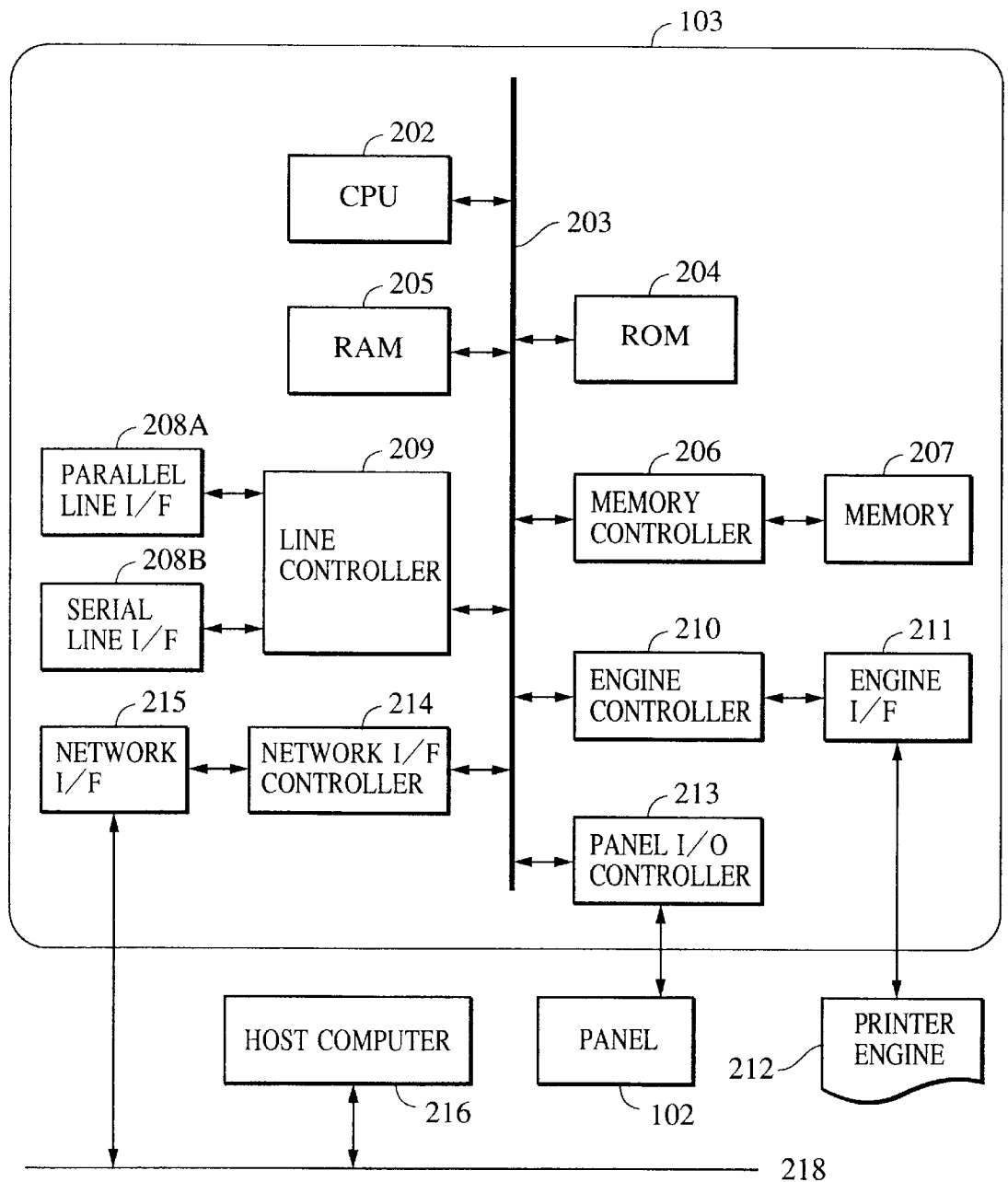
FIG. 2 is a block diagram for explaining a control system of the printer according to the embodiment.

FIG. 2 is a block diagram for explaining a control system of the printer control unit 103.

Referring to FIG. 2, the printer control unit 103 is able to communicate with a host computer 216 on a network 218 via a network interface (I/F) controller 214 for controlling a network interface 215. The network interface controller 214, the network interface 215, etc. are constructed in the form of a network board, shown in FIG. 14, which is detachably attached to the printer.

A CPU 202 controls various devices connected to a bus 203 in accordance with control programs stored in a ROM 204.

A RAM 205 temporarily stores data used in the CPU 202 and printing data.

An engine controller 210 controls a printer engine 212 via an engine interface (I/F) 211 to carry out a printing process.

A memory controller 206 controls a memory 207.

A line controller 209 controls a parallel line I/F 208A and a serial line I/F 208B.

A panel controller 213 controls the control panel 102.

The network 218 interconnects the printer control unit 103 and the host computer 216.

Figure 3:
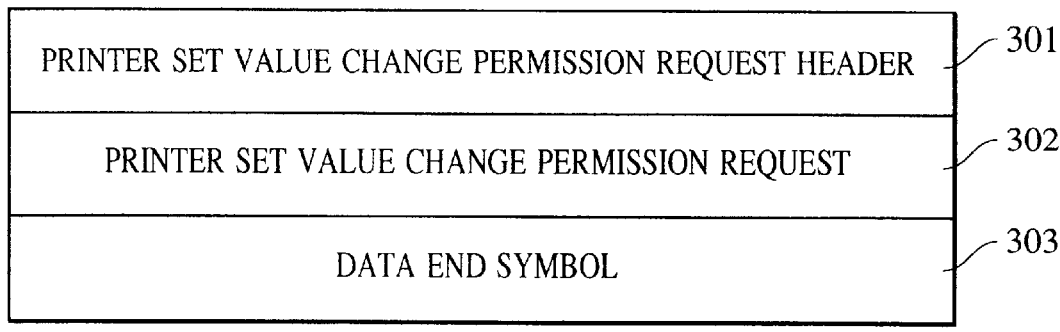
FIG. 3 is a diagram showing one example of format for a printer set value change permission request command.

FIG. 3 shows one example of format for a printer set value change permission request command transmitted from the host computer to the printer.

The illustrated format includes a printer set value change permission request header 301, a change permission request command 302, and an end-of-data symbol 303.

Figure 4:
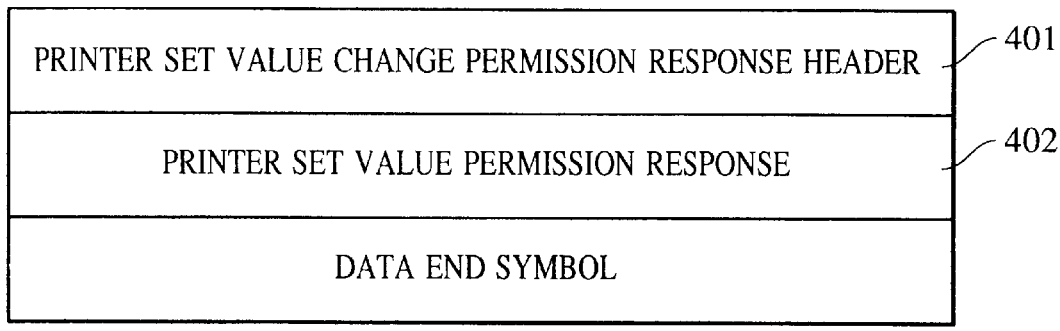
FIG. 4 is a diagram showing one example of format for a printer set value change permission response.

FIG. 4 shows one example of format for a printer set value change permission response transmitted from the printer to the host computer.

The illustrated format includes a printer set value change permission response header 401, a change permission response code 402, and an end-of-data symbol 403.

Figure 5:
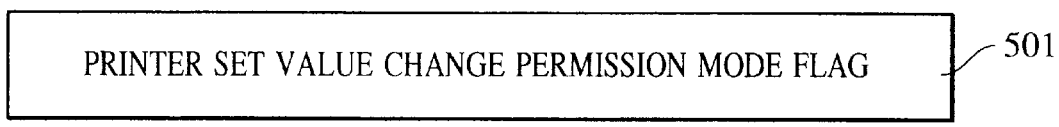
FIG. 5 is a diagram showing one example of format for a printer set value change permission mode flag.

FIG. 5 shows one example of format for a printer set value change permission mode flag managed by the printer.

Figure 6:
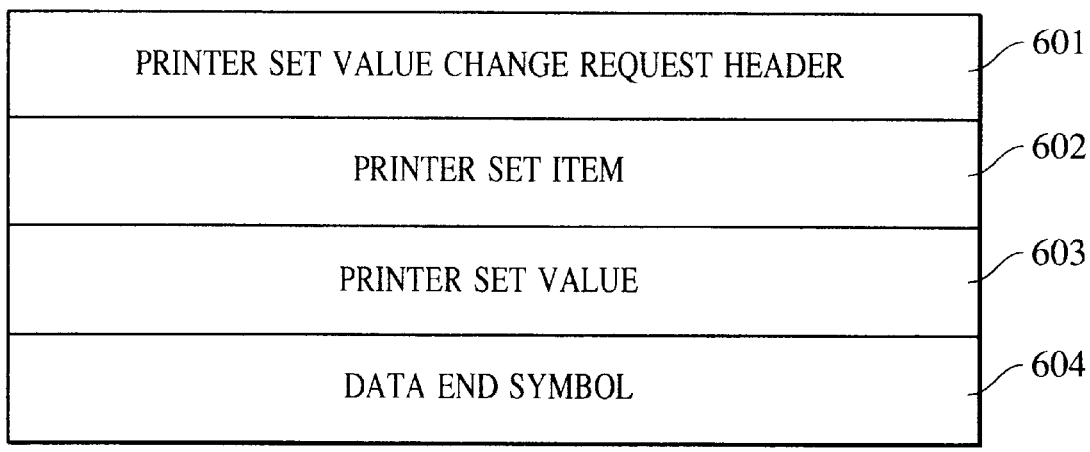
FIG. 6 is a diagram showing one example of format for a printer set value change request command.

FIG. 6 shows one example of format for a printer set value change request command transmitted from the host computer to the printer.

The illustrated format includes a printer set value change request header 601, a change item code 602, a printer set value 603, and an end-of-data symbol 604.

Figure 7:
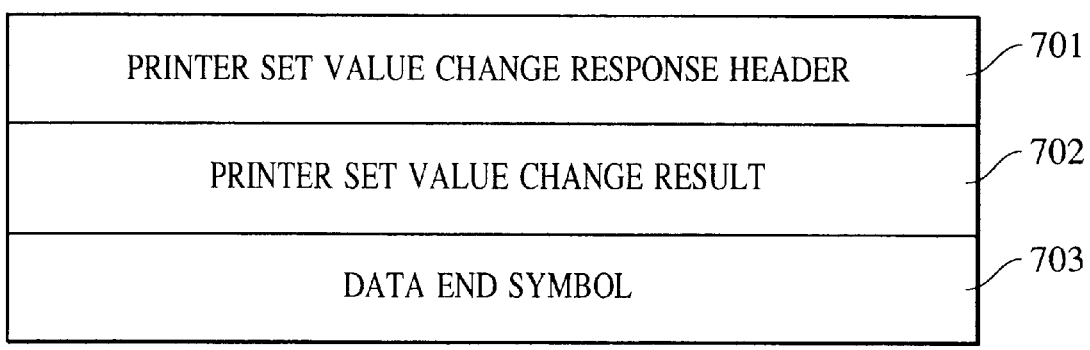
FIG. 7 is a diagram showing one example of format for a printer set value change response.

FIG. 7 shows one example of format for a printer set value change response transmitted from the printer to the host computer.

The illustrated format includes a printer set value change response header 701, a change result code 702, and an end-of-data symbol 703.

Figure 8:
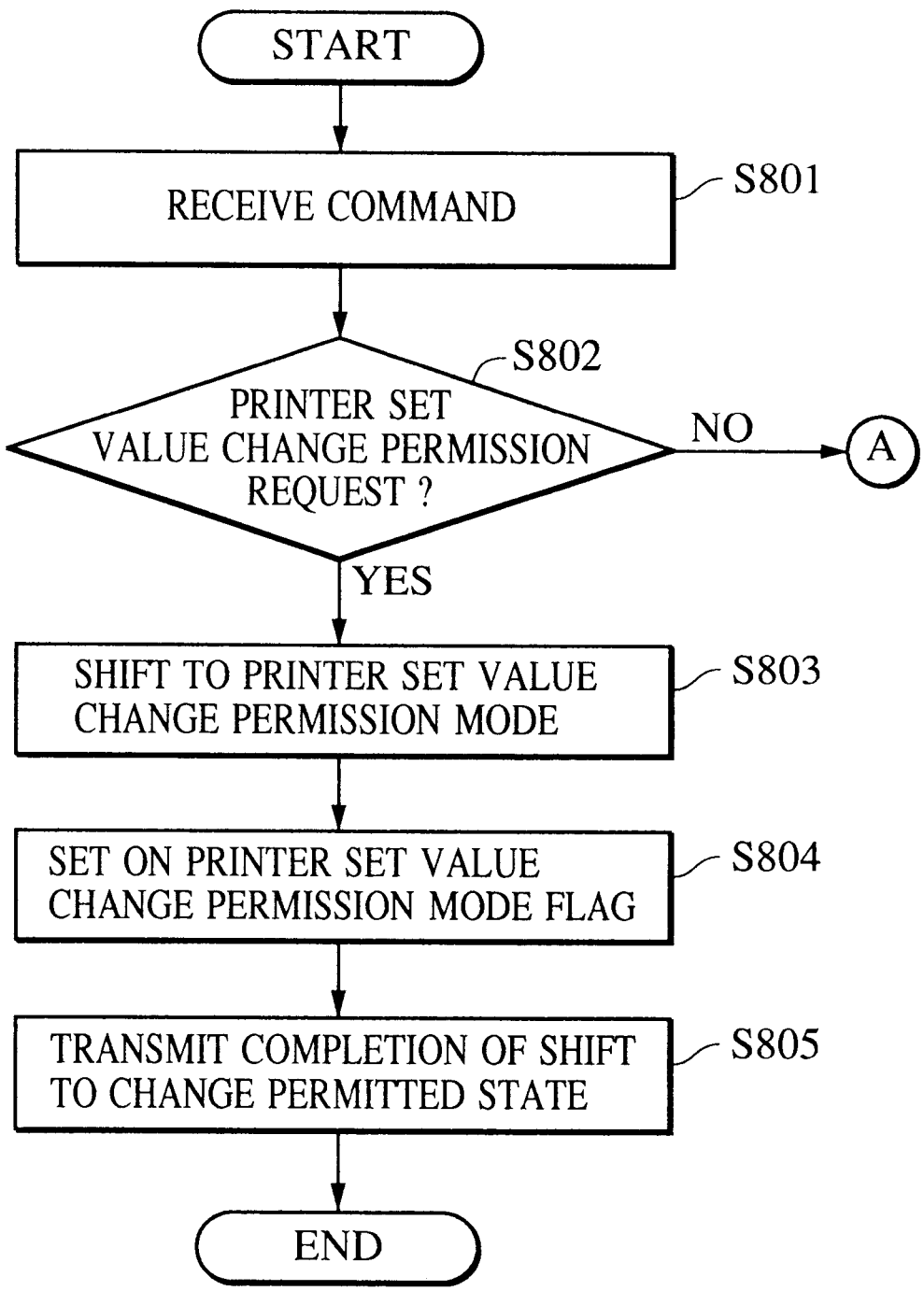
FIG. 8 is a flowchart showing a flow of processing in the printer.
Figure 9:
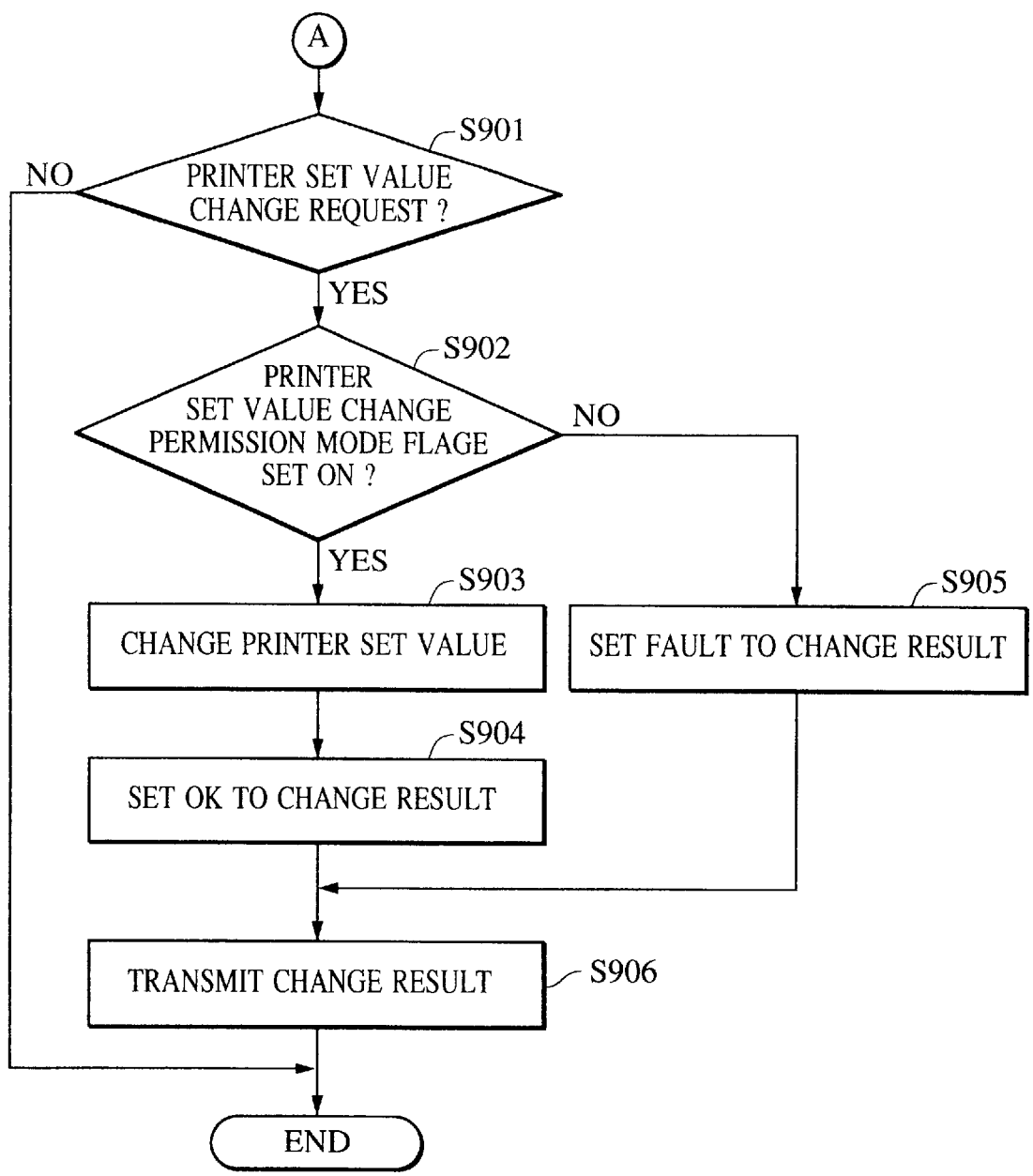
FIG. 9 is a flowchart showing a flow of processing in the printer.
Figure 10:
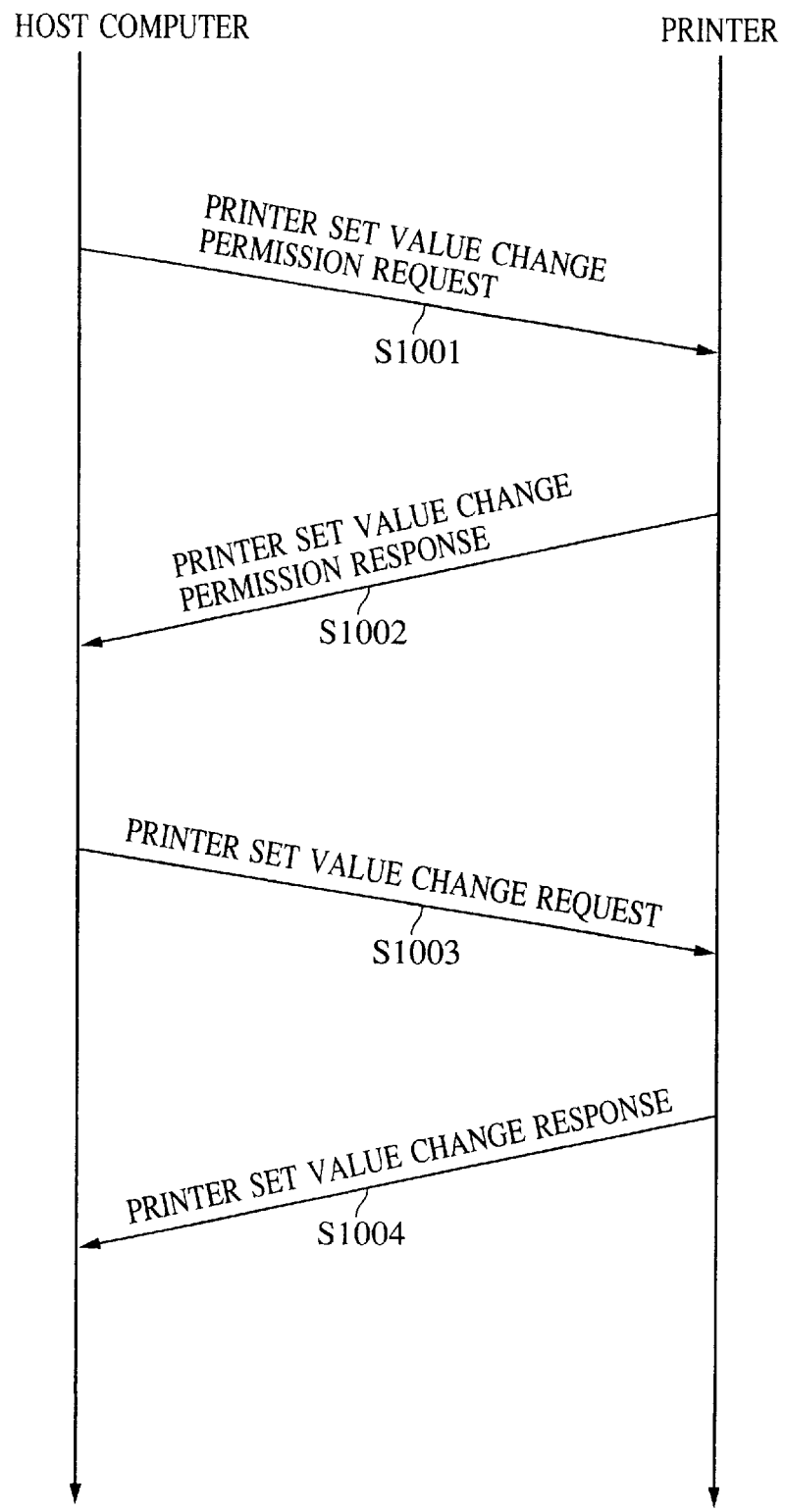
FIG. 10 is a schematic diagram of processing in communication between the printer and a computer.

Next, FIG. 8 is a flowchart showing one example of processing in the printer. FIG. 9 is also a flowchart showing one example of processing in the printer. FIG. 10 schematically shows a flow of processing in communication between the printer and the host computer.

The processing in the printer and the host computer will be described below in detail with reference to FIGS. 8, 9 and 10.

A flow of the processing in the printer will first be described with reference to FIG. 8.

In a normal state, when the CPU 202 of the printer receives a command from the host computer 216 through the network interface 215 (step S801), it determines whether the command is a printer set value change permission request (see FIG. 3) or not (step S802).

If the command is a printer set value change permission request, then the CPU 202 shifts to a printer set value change permission mode (step S803).

In this mode, a control process is executed with the existing techniques in a similar manner as when an offline switch on the control panel 102 is depressed.

The CPU 202 turns on a printer set value change permission mode flag (see FIG. 5) (step S804), creates a response packet (see FIG. 4), and transmits the response packet to the host computer 216 via the network interface controller 214 (step S805).

If the command is determined in step S802 as not being a printer set value change permission request, then the CPU 202 determines whether the command is a printer set value change request (see FIG. 6) or not (step S901).

If the command is a printer set value change request, then the CPU 202 confirms whether a printer set value change permission mode flag (see FIG. 5) is turned on or not (step S902).

If the printer set value change permission mode flag is turned on in step S902, then the CPU 202 changes the printer set value, which is stored in the memory 207, through the memory controller 206 (step S903). After that, the CPU 202 sets OK to the change result (702) and turns off the mode flag (see FIG. 5) to its initial state (step S904).

On the contrary, if the printer set value change permission mode flag is turned off in step S902, then the CPU 202 sets "fault" to the change result (702) (step S905).

When the change result is set, the CPU 202 transmits the result (response) (see FIG. 7) to the host computer 216 via the network interface 215.

Meanwhile, the host computer and the printer perform a sequence of processing steps shown in FIG. 10 through communication between them.

First, the host computer transmits a printer set value change permission request (see in FIG. 3) to the printer (step S1001), and waits for a printer set value change permission response (see FIG. 4) from the printer (step S1002).

At this time, although the response may not be returned at once, the host computer must always wait for arrival of the response.

Subsequently, the host computer transmits a printer set value change request (see in FIG. 6) to the printer (step S1003). Upon receiving the request, the printer changes the set value and thereafter transmits a printer set value change response (see in FIG. 7) to the host computer (step S1004).

Note that the above embodiment employs a network for communication between the printer and the host computer, but the communication process is of course applicable to any types of devices (serial and parallel) so long as the device is capable of bidirectional communication.

The present invention may be applied to not only a system comprising a plurality of devices (such as a host computer, an interface unit, a reader and a printer), but also an equipment comprising a single device (e.g., a copying machine or a facsimile).

It is needless to say that the object of the present invention can also be achieved by supplying, to a system or equipment, a storage medium which stores program codes of software for realizing the function of the above-described embodiment, and causing a computer (or CPU and MPU) in the system or equipment to read and execute the program codes stored in the storage medium.

In such a case, the program codes read out of the storage medium serve in themselves to realize the function of the above-described embodiment, and hence the storage medium storing the program codes constitutes the present invention.

Storage mediums for use in supplying the program codes may be, e.g., floppy disks, hard disks, optical disks, photo-magnetic disks, CD-ROM's, CD-R's, magnetic tapes, non-volatile memory cards, and ROM's.

Also, it is a matter of course that the function of the above-described embodiment is realized by not only a computer reading and executing the program codes, but also an OS (Operating System) or the like which is working on the computer and executes part or whole of the actual process to realize the function. Thus, the latter case is naturally involved in the concept of the present invention.

Further, it is a matter of course that the present invention involves such a case where the program codes read out of the storage medium are written into a memory built in a function extension board mounted in the computer or a function extension unit connected to the computer, and a CPU incorporated in the function extension board or unit executes part or whole of the actual process in accordance with instructions from the program codes, thereby realizing the function of the above-described embodiment.

When the present invention is applied to such a storage medium, the program codes corresponding to the above-described flowchart is stored in the storage medium. In brief, various modules shown in a memory map example of FIG. 11 are stored in the storage medium.

Figure 11:
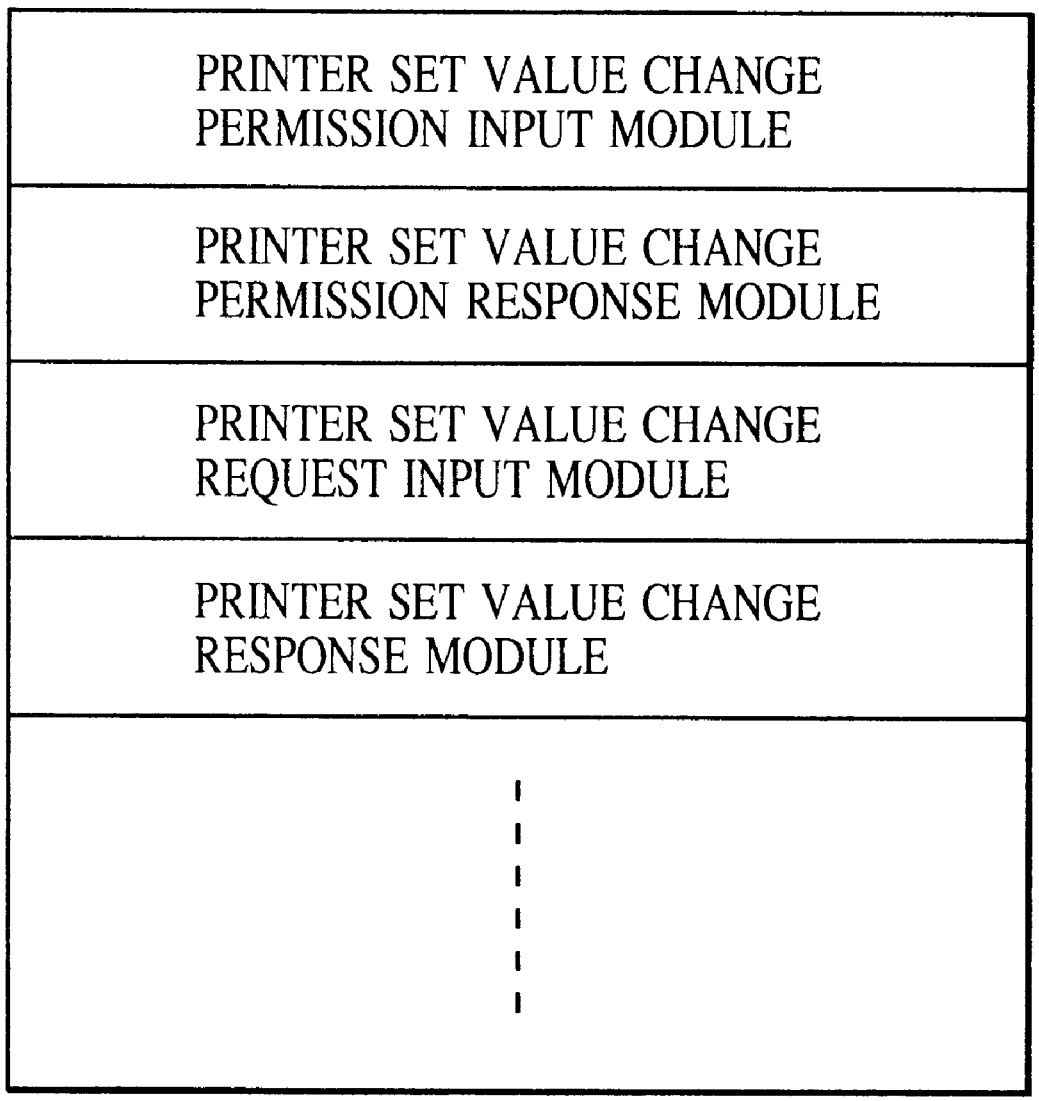
FIG. 11 is a diagram showing one example of layout of a program processing module which can be read and executed by the computer and stored in a recording medium according to another embodiment.

More specifically, it is required for the storage medium to store at least the modules shown in FIG. 11, i.e., "printer set value change permission request input module" for receiving a printer set value change permission request from the host computer, "printer set value change permission response module" for replying a printer set value change permission response to the host computer, "printer set value change request input module" for receiving a printer set value change request from the host computer, and "printer set value change response module" for replying a printer set value change response to the host computer, As described above, with the system including the host computer and the printer according to the embodiment of the present invention, since the printer setting is executed only after the printer is surely brought into a state of capable changing the set value, a user can perform the printer setting even from a remote location without disturbing the printing process under way and the processes intended by other users.

As a result, the present invention makes it possible to form images free from errors under environment in which a printer is connected to a plurality of host computers in common.

The present invention will be further described below from the viewpoint of protocol for communication between a printer and a host computer.

Figure 12:
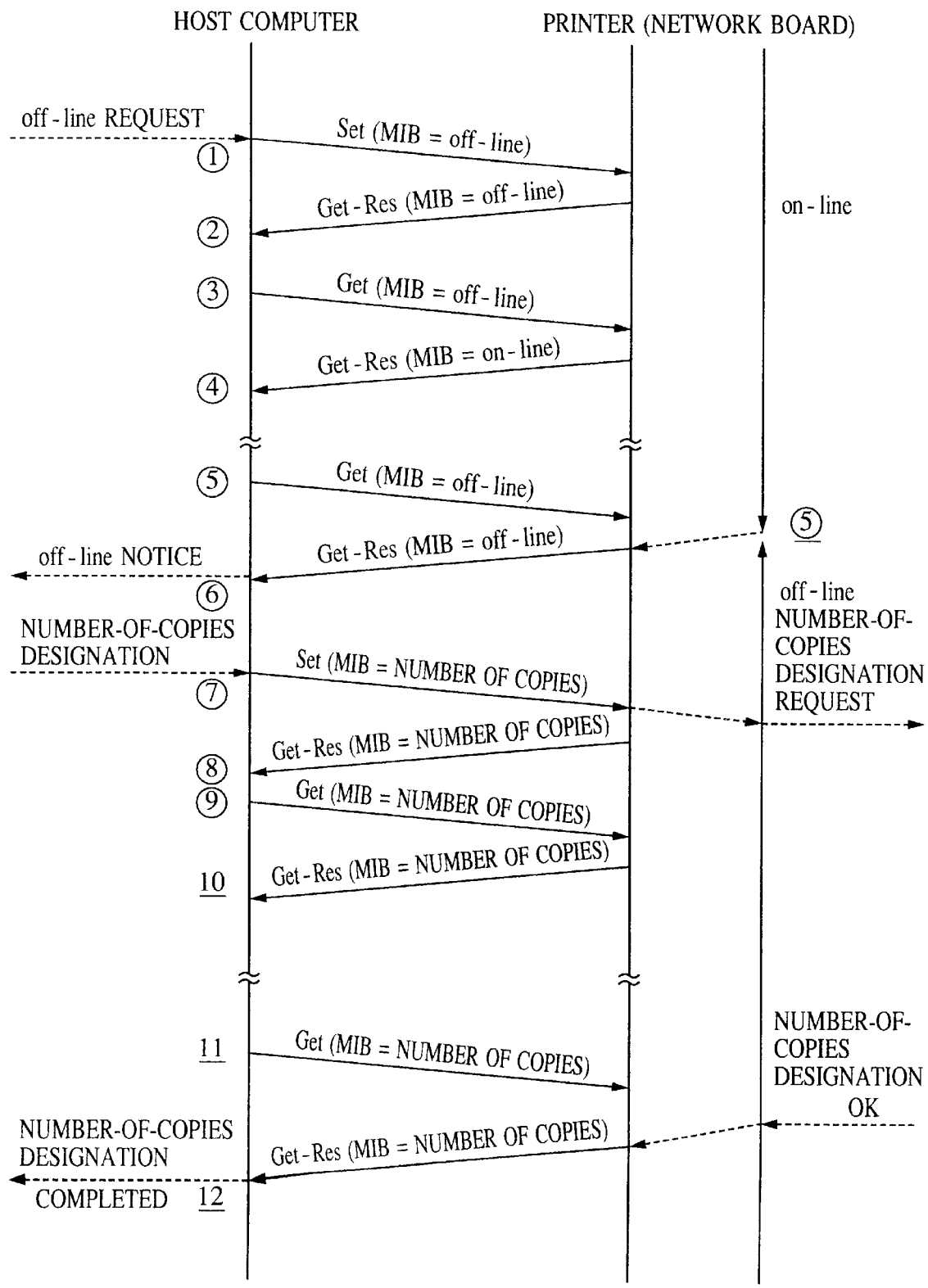
FIG. 12 is a diagram showing one example of SNMP using Canon-MIB in the embodiment of the present invention.

FIG. 12 shows one example of protocol used in the embodiment of the present invention, which employs SNMP (Simple Network Management Protocol)/MIB (Management Information Base) standardized by IETF (Internet Engineering Task Force). To explain the protocol with reference to FIG. 12, the host computer transmits an offline request to the printer (Set-Command) in phase (1), and receives Get-Response from the printer in phase (2). Entering phase (3), the host computer transmits Get-Command to confirm whether the printer status has become off-line or not. If it is determined from Get-Response that the printer status is not off-line, then phases (3) and (4) of the protocol are repeated. If the printer status becomes off-line in phase (5), then it is noticed to the host computer by Get-Response in phase (6) as a response to Get-Command in phase (5) that the printer has become off-line.

Upon confirming that the printer has become off-line, the host computer sets the number of multiple copies in the MIB information and transmits Set-Command in phase (7), followed by receiving a response in phase (8). When the printer is actually set to a designated mode through phases (9) and 10 of the protocol, the set value of the number of copies is put in the MIB information of Get-Response. Then, the host computer confirms in phase 12 that the number of copies has been designated.

By using SNMP/MIB as explained above, it is possible to set the number of multiple copies and an emulation mode (LIPS, PCL, N201, etc.) of the printer.

Figure 13:
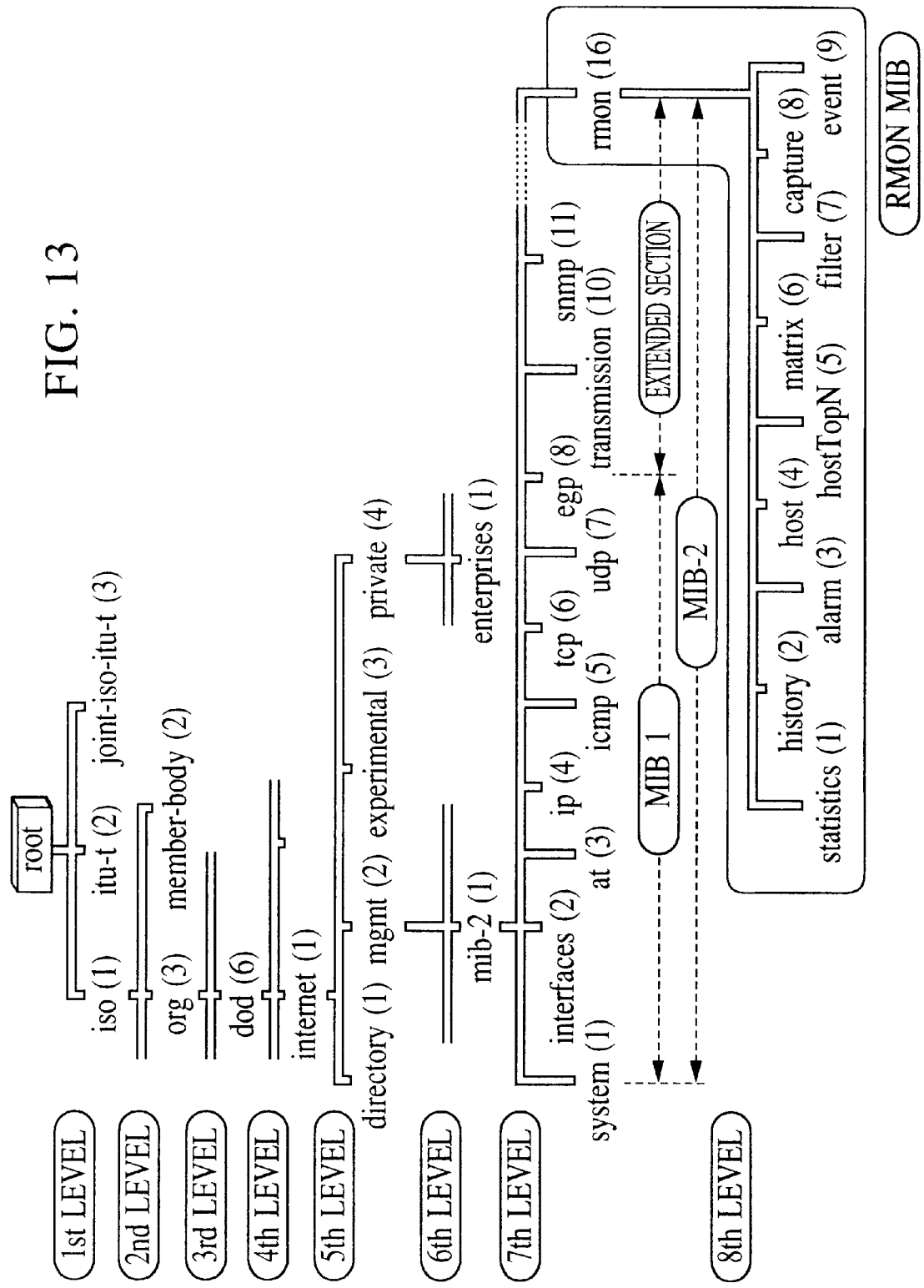
FIG. 13 is a diagram showing a tree structure of the Canon-MIB.

The MIB information is mainly grouped into maker specific values which belong to the tree structure under "enterprise" at a sixth level in FIG. 13, and others. The printer reset, indications on the printer display, etc. are defined in areas other than "enterprise" to be capable of designation or status acquisition.

Alternatively, the number of multiple copies and the emulation mode, for example, explained in the above embodiment may be defined in the tree structure under "enterprise" so that additional instruction of special modes specific to the maker or status acquisition would be enabled.

FIG. 13 shows the tree structure of MIB carried by the SNMP. The MIB tree structure of the on-line/off-line protocol is defined, by way of example, as follows:

iso (1)–org (3)–dod (6)–internet (1)–private (4)–enterprise (1)–canon (1602)–can ON/OFF (1).

Likewise, the MIB tree structure for designating the number of copies is defined as follows:

iso (1)–org (3)–dod (6)–internet (1)–private (4)–enterprise (1)–canon (1602)–can Tab (2).

With the above tree structure, the number of copies and the emulation mode are set in the printer. The MIB is divided into standard MIB and extended MIB which is used for particular management of the printer status. Thus, ordinary code data such as a page descriptive language representing a page, and command information such as indicating how many copies are to be for each page, are transferred to the printer side through a common line, e.g., the network controller 214 in FIG. 2 or a printer I/F controller 513 in FIG. 14. However, a burden of command analysis with the page descriptive language is relieved.

Figure 14:
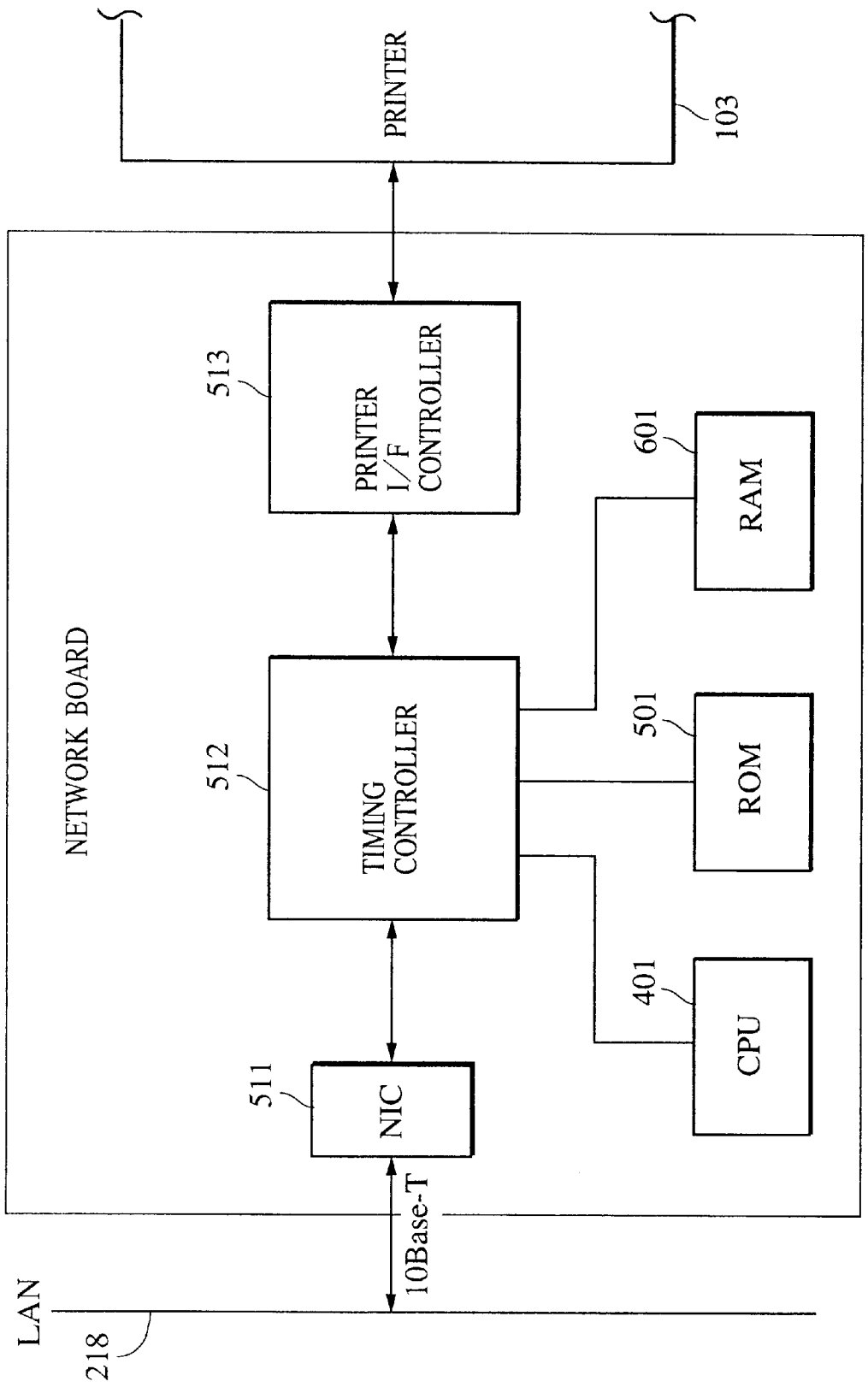
FIG. 14 is a block diagram showing a hardware configuration of a network board.

FIG. 14 shows an embodiment of hardware of a network board according to the present invention. Denoted by 511 is a NIC (Network Interface Chip) connected to an either net (10 Base-T) for supporting a layer 1 (physical layer). Denoted by 513 is a printer I/F controller for sending printing data and various set commands to the printer, 401 is a CPU (Control Processor Unit) for controlling the entirety of the network board, 501 a ROM (Read Only Memory) for storing the programs to execute operation of the CPU shown in FIG. 12, for example, and 601 is a RAM (Random Access Memory) serving as a work area necessary for operating the CPU. Denoted by 512 is a timing controller for arbitrating bus operations executed by the CPU, ROM, RAM, NIC and the printer controller.

The network board of the above configuration operates the protocol on the network using the SNMP/MIB through the NIC 511.

Figure 15:
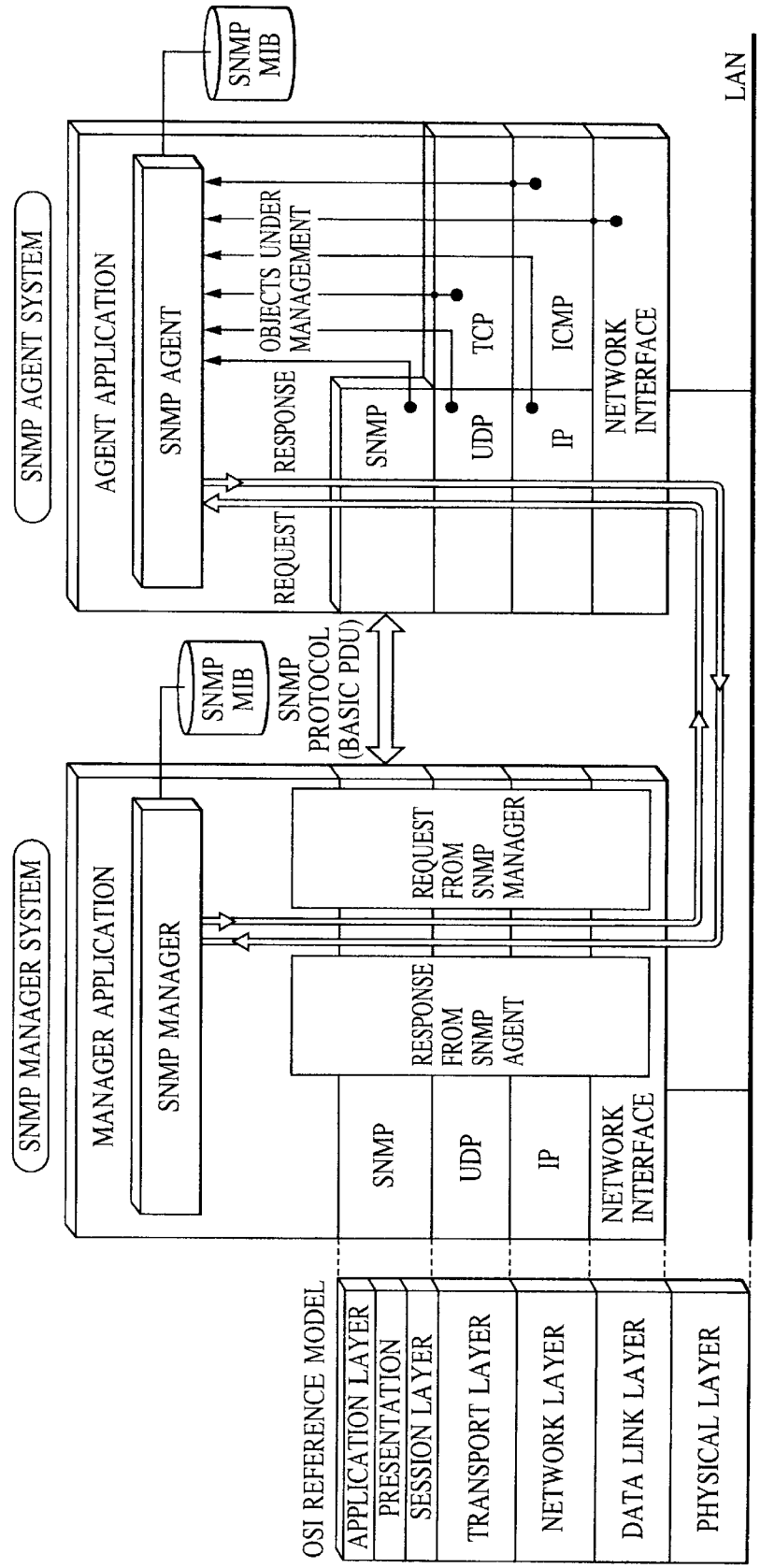
FIG. 15 is a diagram for explaining SNMP/MIB.

FIG. 15 is a diagram for explaining an outline of the SNMP/MIB. The SNMP is a standard management protocol used under TCP/IP network environment and has five management functions below:

(1) Configuration Management
(2) Performance Management
(3) Fault Management
(4) Accounting Management
(5) Security Management These functions are systematized with RFC (Request For Comments) as follows.

(1) SNMP (RFC 1067, 1098, 1157)

The SNMP comprises an SNMP manager (managing side) and an SNMP agent (managed side). The SNMP represents a communication procedure for use in exchanging management information between both the sides and managing various devices connected to the network.

(2) MIB (RFC 1066, 1156, 1158, 1213)

MIB is an abbreviation of Management Information Base. Information managed by the SNMP manager and agent is called an object under management, and an assembly of objects under management is called MIB.

In FIG. 15, the SNMP manager executes a network management function by outputting a request (GetRequest, SetRequest) for collecting or changing an object under management to the SNMP agent. Only when a fault occurs in the agent managed by the manager, an event notice (Trap) for informing the occurrence of a fault is issued from the agent and received by the manager.

The SNMP agent is a managed system in the SNMP and executes a network management function in response to requests from the manager. Upon receiving a request for collecting or changing an object under management from the manager, the agent replies a response (GetResponse). The agent can also notice an event occurred on the agent side to the manager.

Thus, the SNMP is a connectionless protocol for executing collection and change of information about the objects under management, or notice of an event between the SNMP manager and agent. Therefore, when information (PDU: Protocol Data Unit) is transferred between the manager and the agent, the SNMP employs UDP (User Datagram Protocol) which is a connectionless protocol. Note that abbreviations used in FIG. 15 have, though well known in the art, the meanings below; PDU: Protocol Data Unit, UDP: User Datagram Protocol, IP: Internet Protocol, TCP: Transmission Control Protocol, and ICMP: Internet Control Message Protocol.

As described hereinabove, according to the present invention, the number of copies and the operating mode (emulation mode) can be set in an image forming apparatus by application of SNMP using extended MIB. Further, unlike the conventional system using printer descriptive languages such as PCL and LIPS, the load imposed on the printer side during image data processing is relieved and the efficiency of the printing process is improved. Since the MIB is employed, it is also possible to set image forming apparatus manufactured by other makers (e.g., to reset the apparatus) by using MIB parameters which are accepted as standards in the industry. Additionally, by using MIB which is prepared by each maker and defined after the enterprise No. (maker code), the special modes (the number of copies, the name of the printer, etc.) specific to the maker can be instructed from the host computer or the status of those special modes can be indicated on the host side.

As is apparent from the above detailed description, with the system including the host computer and the image forming apparatus (printer) according to the present invention, since the printer setting is executed only after the printer is surely brought into a state of capable changing the set value, a user can perform the printer setting even from a remote location without disturbing the printing process under way and the processes intended by other users.

Consequently, the present invention makes it possible to set instruction information, that can be set from a control panel of the apparatus, from a remote location without disturbing any printing process.

What is claimed is:

1. A communication control apparatus, comprising:
    a first receiver for receiving, from an information processing apparatus, a first request command for requesting permission to set a parameter read by an image forming apparatus;
    a transmitter for sending, to the information processing apparatus, permission to set the parameter corresponding to the first request command received by said first receiver;
    a second receiver for receiving, from the information processing apparatus, a second request command for requesting setting of the parameter to a value; and
    setting means for setting the parameter to the value in response to the second request command sent by the information processing apparatus to which the permission is sent.

2. An apparatus according to claim 1, further comprising informing means for informing the information processing apparatus that the parameter is set.

3. An apparatus according to claim 1, further comprising a memory for storing flag information which indicates whether the permission has been sent.

4. An apparatus according to claim 1, wherein said setting means sets the parameter if the flag information indicates that the permission has been sent.

5. An apparatus according to claim 1, further comprising forming means for forming images in accordance with the parameter.

6. An apparatus according to claim 1, wherein the image forming apparatus is connected to the information processing apparatus via a network.

7. An apparatus according to claim 1, wherein the image forming apparatus is connected to a plurality of information processing apparatuses.

8. An apparatus according to claim 1, wherein the parameter includes a print parameter.

9. An apparatus according to claim 1, wherein the parameter includes MIB (Management Information Base) information.

10. An apparatus according to claim 1, wherein the parameter includes a parameter which can be set by a PDL (Page Description Language).

11. An apparatus according to claim 1, wherein the parameter includes a parameter concerning a selection of a cassette, a number of copies, or an emulation mode.

12. An apparatus according to claim 1, wherein the first request command is a SNMP (Simple Network Management Protocol) command.

13. An apparatus according to claim 1, wherein the image forming apparatus is a printer.

14. An apparatus according to claim 1, wherein the communication control apparatus is a network board attached to the image forming apparatus.

15. An apparatus according to claim 1, wherein the parameter includes a parameter set by a language that describes print data.

16. An apparatus according to claim 1, wherein the parameter includes MIB information defined in an enterprise area.

17. An apparatus according to claim 1, wherein
    said first receiver receives, from the information processing apparatus, a command to set a predetermined parameter to a predetermined value, and
    said transmitter sets the predetermined parameter to the predetermined value and sends the permission to the information processing apparatus.

18. An apparatus according to claim 17, wherein the predetermined parameter is predetermined MIB information.

19. An apparatus according to claim 17, wherein the predetermined parameter is a parameter indicating whether the image forming apparatus is off-line or not.

20. An image processing apparatus, comprising:
    a first receiver, arranged to receive, from an information processing apparatus, a first request command for requesting permission to set a parameter read by said image processing apparatus;
    a transmitter, arranged to send, to the information processing apparatus, permission to set the parameter corresponding to the first request command received by said first receiver;
    a second receiver, arranged to receive, from the information processing apparatus, a second request command for requesting setting of the parameter to a value; and
    a setting unit, arranged to set the parameter to the value in response to the second request command sent by the information processing apparatus to which the permission is sent.

21. An apparatus according to claim 20, further comprising a memory, arranged to store flag information indicating whether the permission has been sent, wherein said setting unit sets the parameter when the flag information indicates that the permission has been sent.

22. An apparatus according to claim 20, wherein the parameter includes a print parameter.

23. An apparatus according to claim 20, wherein the parameter includes MIB information, and the first request command and the second request command are SNMP commands.

24. An apparatus according to claim 20, wherein the parameter includes MIB information defined in an enterprise area.

25. An apparatus according to claim 20, wherein the parameter includes a parameter concerning one of a selection of a cassette, a number of copies, and an emulation mode.

26. An apparatus according to claim 20, wherein said image processing apparatus is a printer.

27. An apparatus according to claim 20, wherein
said first receiver receives, from the information processing apparatus, a command to set a predetermined parameter to a predetermined value, and
said transmitter sets the predetermined parameter to the predetermined value and sends the permission to the information processing apparatus.

28. An apparatus according to claim 20, further comprising the information processing apparatus, which includes:
a first sender, arranged to sending the first request command to said image processing apparatus, and a second sender, arranged to send the second request command to said image processing apparatus.

29. An apparatus according to claim 27, wherein the predetermined parameter is parameter information indicating whether said image forming apparatus is off-line or not.

30. A communication control method, comprising:
a first reception step of receiving, from an information processing apparatus, a first request command for requesting permission to set a parameter read by an image processing apparatus;
a transmission step of sending, to the information processing apparatus, permission to set the parameter corresponding to the first request command received in said first reception step;
a second reception step of receiving, from the information processing apparatus, a second request command for requesting setting of the parameter to a value; and
a setting step of setting the parameter to the value in response to the second request command sent by the information processing apparatus to which the permission is sent.

31. A method according to claim 30, wherein said setting step sets the parameter when flag information stored in a memory indicates that the permission has been sent.

32. A method according to claim 30, wherein the parameter includes a print parameter.

33. A method according to claim 30, wherein the parameter includes MIB information, and the first request command and the second request command are SNMP commands.

34. A method according to claim 30, wherein the parameter includes MIB information defined in an enterprise area.

35. A method according to claim 30, wherein the parameter includes a parameter concerning a selection of one of a cassette, a number of copies, and an emulation mode.

36. A method according to claim 30, wherein the image processing apparatus is a printer.

37. A method according to claim 30, wherein said communication control method is executed by a network board attached to the image processing apparatus.

38. A method according to claim 30, wherein said first receiving step receives, from the information processing apparatus, a command to set a predetermined parameter to a predetermined value, and said transmission step sets the predetermined parameter to the predetermined value and sends the permission to the information processing apparatus.

39. A method according to claim 38, wherein the predetermined parameter is parameter information indicating whether the image forming apparatus is off-line or not.

40. A computer-readable storage medium storing a program for implementing a method of controlling a communication with an information processing apparatus, the program comprising:

program code for a first reception step of receiving, from an information processing apparatus, a first request command for requesting permission to set a parameter read by an image processing apparatus;
program code for a transmission step of sending, to the information processing apparatus, permission to set the parameter corresponding to the first request command received in the first reception step;
program code for a second reception step of receiving, from the information processing apparatus, a second request command for requesting setting of the parameter to a value; and
program code for a setting step of setting the parameter to the value in response to the second request command sent by the information processing apparatus to which the permission is sent.

41. A storage medium according to claim 40, wherein the setting step includes setting the parameter when flag information stored in a memory indicates that the permission has been sent.

42. A storage medium according to claim 40, wherein the parameter includes a print parameter.

43. A storage medium according to claim 40, wherein
the parameter includes MIB information, and
the first request command and the second request command are SNMP commands.

44. A storage medium according to claim 40, wherein the parameter includes MIB information defined in an enterprise area.

45. A storage medium according to claim 40, wherein the parameter includes a parameter concerning a selection of one of a cassette, a number of copies, and an emulation mode.

46. A storage medium according to claim 40, wherein the image processing apparatus is a printer.

47. A storage medium according to claim 40, wherein the program is executed by a network board attached to the image forming apparatus.

48. A storage medium according to claim 40, wherein
the first reception step receives, from the information processing apparatus, a command to set a predetermined parameter to a predetermined value, and
the transmission step sets the predetermined parameter to the predetermined value and sends the permission to the information processing apparatus.

49. A storage medium according to claim 48, wherein the predetermined parameter is parameter information indicating whether the image forming apparatus is off-line or not.

50. A computer program product embodying a program for implementing a method of controlling a communication with an information processing apparatus, the program comprising:
program code for a first reception step of receiving, from an information processing apparatus, a first request command for requesting permission to set a parameter read by an image processing apparatus;
program code for a transmission step of sending, to the information processing apparatus, permission to set the parameter corresponding to the first request command received in the first reception step;
program code for a second reception step of receiving, from the information processing apparatus, a second request command for requesting setting of the parameter to a value; and
program code for a setting step of setting the parameter to the value in response to the second request command sent by the information processing apparatus to which the permission is sent.

51. A program product according to claim 50, wherein the setting step includes setting the parameter when flag information stored in a memory indicates that the permission has been sent.

52. A program product according to claim 50, wherein the parameter includes a print parameter.

53. A program product according to claim 50, wherein the parameter includes MIB information, and the first request command and the second request command are SNMP commands.

54. A program product according to claim 50, wherein the parameter includes MIB information defined in an enterprise area.

55. A program product according to claim 50, wherein the parameter includes a parameter concerning a selection of one of a cassette, a number of copies, and an emulation mode.

56. A program product according to claim 50, wherein the image processing apparatus is a printer.

57. A program product according to claim 50, wherein the program is executed by a network board attached to the image forming apparatus.

58. A program product according to claim 50, wherein
the first reception step receives, from the information processing apparatus, a command to set a predetermined parameter to a predetermined value, and
the transmission step sets the predetermined parameter to the predetermined value and sends the permission to the information processing apparatus.

59. A program product according to claim 58, wherein the predetermined parameter is parameter information indicating whether the image forming apparatus is off-line or not.

60. A method for setting a parameter read by an image processing apparatus, said method comprising:
a first transmission step of transmitting, from an information processing apparatus to the image processing apparatus, a first request command for requesting permission to set a parameter read by the image processing apparatus;
a second transmission step of transmitting, from the image processing apparatus to the information processing apparatus, permission to set the parameter corresponding to the first request command transmitted in said first transmission step;
a third transmission step of transmitting, from the information processing apparatus to the image processing apparatus, a second request command for requesting setting of the parameter to a value; and
a setting step of setting the parameter to the value in response to the second request command transmitted from the information processing apparatus to which the permission is sent.

* * * * *

UNITED STATES PATENT AND TRADEMARK OFFICE
CERTIFICATE OF CORRECTION

PATENT NO. : 6,178,004 B1
DATED : January 23, 2001
INVENTOR(S) : Masato Ochiai

It is certified that error appears in the above-identified patent and that said Letters Patent is hereby corrected as shown below:

<u>Title page,</u>
<u>Item [57], Abstract,</u>
Line 5, "comprises" should read -- includes --.
Line 18, "of" should be deleted.

<u>Column 1,</u>
Line 26, "problems below." should read -- the following problems. --.

<u>Column 9,</u>
Line 19, "of capable" should read -- capable of --.

Signed and Sealed this

Sixteenth Day of October, 2001

*Attest:*

NICHOLAS P. GODICI
*Attesting Officer*   *Acting Director of the United States Patent and Trademark Office*